United States Patent [19]

Liou

[11] Patent Number: 5,228,320

[45] Date of Patent: Jul. 20, 1993

[54] LOCKING ARRANGEMENT FOR THE GEARSHIFT STICK OF VEHICLES

[76] Inventor: Gaieter Liou, No. 48, Ton Hwa St., San-Min Dist., Kaohsiung, Taiwan

[21] Appl. No.: 977,870

[22] Filed: Nov. 17, 1992

[51] Int. Cl.[5] .................... B60R 25/06; E05B 65/12
[52] U.S. Cl. .......................... 70/247; 70/202; 70/203
[58] Field of Search ............... 70/247, 248, 202, 203, 70/38 A, 39, 233; 403/391, 390, 389, 396, 397

[56] References Cited

U.S. PATENT DOCUMENTS

| | | | |
|---|---|---|---|
| 3,032,603 | 5/1962 | Whitley | 403/391 |
| 3,497,249 | 2/1970 | DuBois | 403/391 |
| 4,436,232 | 3/1984 | Zane et al. | 70/233 |
| 4,693,099 | 9/1987 | Cykman | 70/247 |
| 5,127,562 | 7/1992 | Zane et al. | 70/233 |

FOREIGN PATENT DOCUMENTS 0049904  4/1982  European Pat. Off. ............. 70/233

Primary Examiner—Peter M. Cuomo
Assistant Examiner—Darnell Boucher
Attorney, Agent, or Firm—Jacobson, Price, Holman & Stern

[57] ABSTRACT

A locking arrangement for the gearshift stick of vehicles, having a housing provided with two openings formed by two shoulders, two locking plates and two ear plates for two legs of a shackle of a padlock to extend therein to lock the shackle immovable when the shackle is to be stored in the unlocked separated condition.

3 Claims, 3 Drawing Sheets

LOCKING ARRANGEMENT FOR THE GEARSHIFT STICK OF VEHICLES

BACKGROUND OF THE INVENTION

A U.S. patent Ser. No. 4,693,699 titled "Locking Arrangement For The Gearshift Stick Of Vehicles" has a shackle 24 of a padlock, which is kept on protrusions 48 on a cover 44 for storing the shackle in the unlocked and separated orientation. But there is no locking means to keep securely the shackle thereon, so it may fall off because of vibration during running of the vehicle.

SUMMARY OF THE INVENTION

The object of the present invention is to offer a locking arrangement for the gearshift stick of vehicles, which has a housing, a padlock and a base. The housing is shaped as an inverted thick T cross-section, containing the padlock body and having two leg holes for two legs of a shackle of the padlock to pass through to fit in two legs holes in the padlock body to lock the shackle on a gearshift lever immovable with a key inserting through a key hole in an upper surface of the housing and then in a key hole in the padlock body.

The housing is structured to have two openings formed with two shoulders, two ear plates extending horizontally from both sides above the shoulders, two projection-down walls extending from the ear plates, in order that two legs of the shackle can be place on the shoulders to extend in the two openings, locked with an elastically extending-out plate springs fitting in two notches in the two legs of the shackle, when the shackle is to be stored in the unlocked and separated orientation.

DETAILED DESCRIPTION OF THE INVENTION

Figure 1:
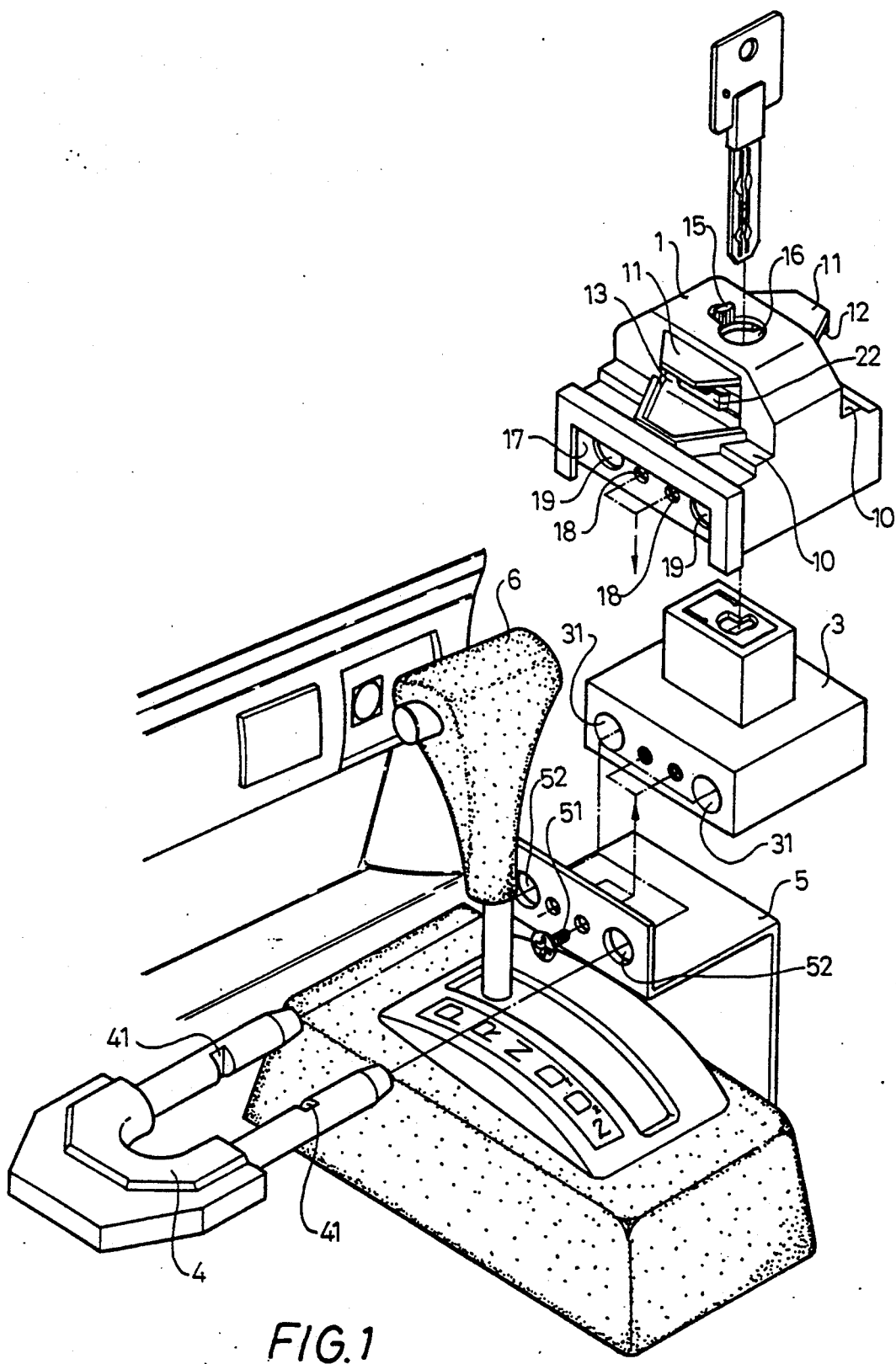
FIG. 1 is an exploded perspective view of a lock arrangement for the gearshift stick of vehicles in the present invention.
Figure 2:
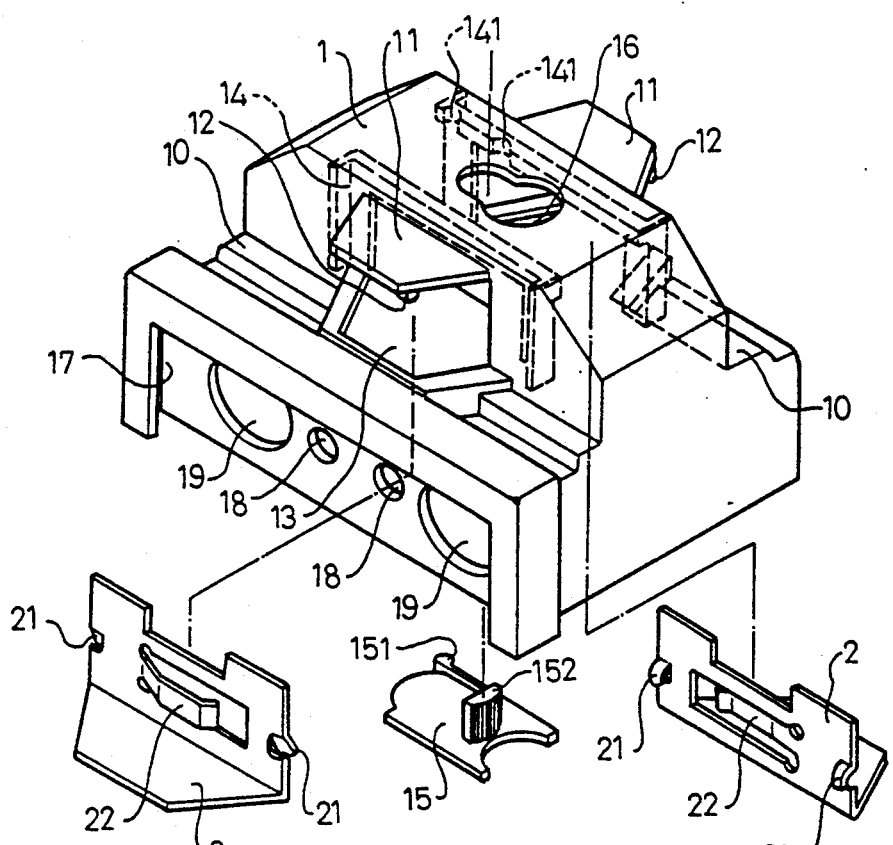
FIG. 2 is an exploded perspective view of a housing in the lock arrangement for the gearshift stick of vehicles in the present invention.

A locking arrangement for the gearshift stick of vehicles in the present invention, as shown in FIG. 1, comprises a housing 1 containing a padlock body 3 and combines with a base 5. The padlock body 3 is combined with a shackle 4 having two parallel legs extending to pass through two holes 52, 52 in the base 5 and inserting in leg holes 31, 31 in the padlock body 3 for being locked so as to keep immovable a gearshift stick 6 of a vehicle. If the shackle 4 is in the unlocked and separated condition, it can be placed horizontally in two openings on two shoulders 10, 10 in the housing 1 and pinched securely by two plate springs 22, 22.

The housing 1 is made of plastics, having a cross-section shaped as an inverted thick T, two shoulders 10, 10 of different width, two ear plates 11, 11 extending sidewise above the shoulders 10, 10, two projection-down walls 12, 12 extending from the ear plates 11, 11, two notches 13, 13 in the walls between the ear plates 11, 11 and the shoulder 10, 10, two locking plates 2, 2 fitting fixedly in two guide grooves 14, 14 of L-shaped cross-section formed around the notches 13, 13. And one of the guide grooves 14, 14 has a plurality of position grooves 141 for a projection 151 of a movable cap 15 to selectably engage therein so as to keep the movable cap 15 in one of its positions.

The housing 1 has a key hole 16 in an upper surface to be closed or opened by the movable cap 15 located between the housing 1 and the padlock body 3. The cap 15 has an upright post 152 to extend out of the key hole 16 for moving the cap 15, and both sides fitting in the guide grooves 14, 14 so as to stop the cap 15 in one of positions after it is moved.

The padlock body 3 is deposited in the housing 1, which has two pairs of holes 18, 18, 19, 19 in one lower vertical side respectively for the screws 51, 51 and the shackle 4 to pass through, and two position grooves 17, 17 to engage an upright wall of the base 5.

The two locking plates 2, 2 fit in the notches 13, 13, respectively having two projections 21, 21 on both sides to engage the guide grooves 14, 14 to secure the plates 2, 2 in place, and a plate spring 22 extending outward elastically on the shoulders 10, 10.

Figure 3:
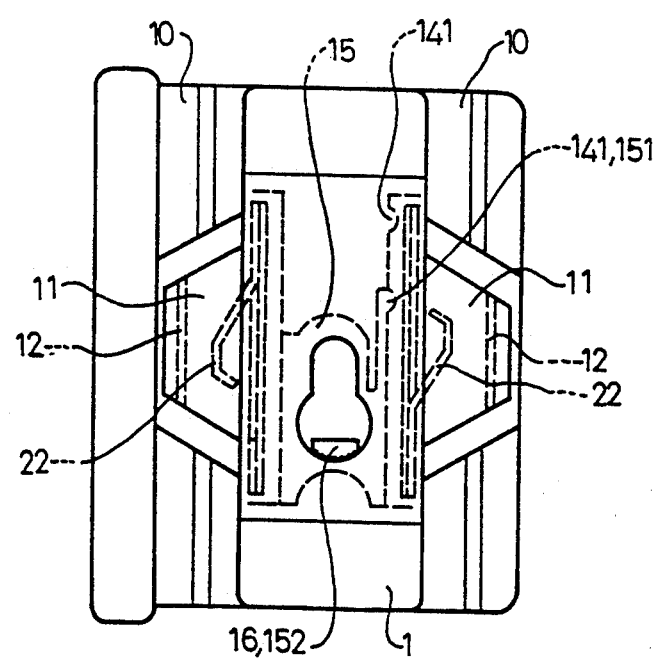
FIG. 3 is an upper side view of the housing in the locking arrangement for the gearshift stick of vehicles in the present invention.
Figure 4:
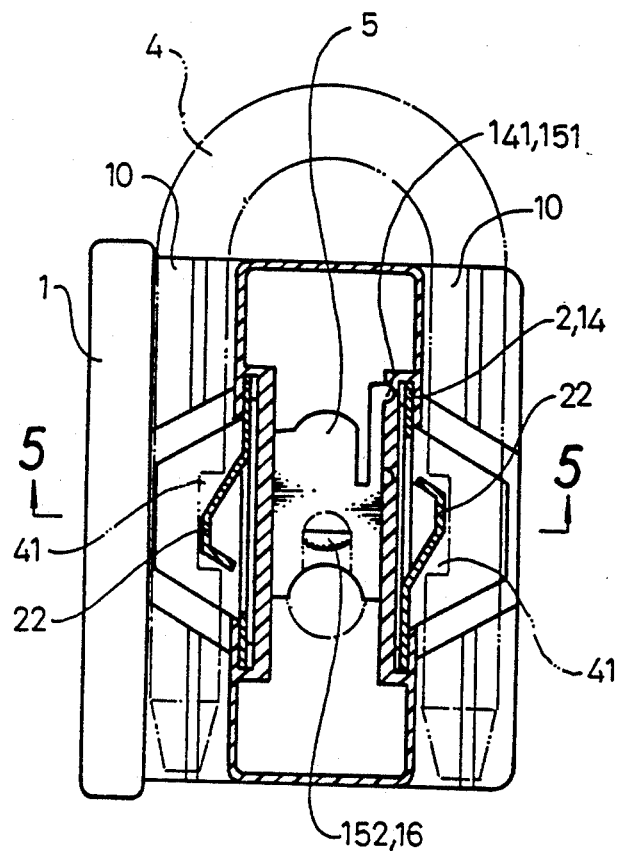
FIG. 4 is a cross-sectional view of line 4—4 in FIG. 5.
Figure 5:
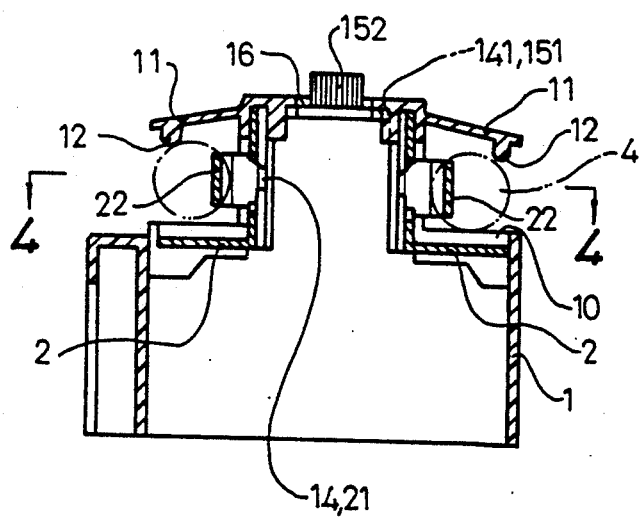
FIG. 5 is a cross-sectional view of line 5—5 in FIG. 4.

FIG. 3 shows that the key hole 16 is normally closed by the cap 15 when a key is not to be inserted therein. The ear plates 11, 11, two projection walls 12, 12, the plate springs 22, 22 and the shoulders 10, 10 from two openings for two legs of the shackle 4 to extend therein and to be locked with notches 41, 41 in the two legs of the shackle 4 and the plate springs 22, 22 fitting therein so that the shackle 4 can be prevented from falling off owing to vibration caused in running of a vehicle, when the shackle is to be stored in the unlocked and separated condition.

What is claimed is:

1. A locking arrangement for the gearshift stick of vehicles comprising;
    a housing shaped as an inverted thick T cross-section, having two opposite flat shoulders of different size, two horizontal ear plates above the shoulders, two projection-down walls extending from the ear plates, two notches in vertical walls between the ear plates and the shoulders, two guide grooves around the notches for two locking plates to fit fixedly therein, said ear plates, said projecting walls, said locking plates and said shoulders forming two openings for two legs of a shackle of a padlock to extend therein;
    two locking plates fitting fixedly in said guide grooves, having a plate spring extending elastically outward above the shoulders; and
    said housing structured such that two legs of the shackle can be inserted to extend in the openings formed by the ear plates, the projection walls, the locking plates and the shoulders, and two notches in the legs of the shackle fitting with the plate spring of the locking plates so as to lock the shackle immovable.

2. The locking arrangement for the gearshift stick of vehicles as claimed in claim 1, wherein said housing is provided with a key hole in an upper surface for a key to pass through, and a movable cap being deposited between the housing and a padlock body, having an upright post to extend up through the key hole so that the upright post is moved permitting the cap to close or open the key hole.

3. The locking arrangement for the gearshift stick of vehicles as claimed in claim 1 wherein said movable cap has two sides to move between said guide grooves in the housing, and one of said guide grooves has a plurality of position grooves, and said cap has a projection on a side so that said projection engages one of said position grooves, securing the cap at one of its positions when the cap is moved.

* * * * *